United States Patent
Ilic et al.

(10) Patent No.: US 9,959,162 B2
(45) Date of Patent: May 1, 2018

(54) AUTOMATED REMOTE NETWORK TARGET COMPUTING DEVICE ISSUE RESOLUTION

(71) Applicant: HEWLETT PACKARD ENTERPRISE DEVELOPMENT LP, Houston, TX (US)

(72) Inventors: Vladimir Ilic, Diegem (BE); Volker Messinger, Diegem (BE); Olivier Gomez, Grenoble (FR)

(73) Assignee: HEWLETT PACKARD ENTERPRISE DEVELOPMENT LP, Houston, TX (US)

( * ) Notice: Subject to any disclaimer, the term of this patent is extended or adjusted under 35 U.S.C. 154(b) by 175 days.

(21) Appl. No.: 14/908,099

(22) PCT Filed: Jul. 31, 2013

(86) PCT No.: PCT/US2013/053087
§ 371 (c)(1),
(2) Date: Jan. 27, 2016

(87) PCT Pub. No.: WO2015/016925
PCT Pub. Date: Feb. 5, 2015

(65) Prior Publication Data
US 2016/0224406 A1    Aug. 4, 2016

(51) Int. Cl.
*G06F 11/00*    (2006.01)
*G06F 11/07*    (2006.01)
*H04L 12/24*    (2006.01)

(52) U.S. Cl.
CPC ........ *G06F 11/0793* (2013.01); *G06F 11/079* (2013.01); *G06F 11/0709* (2013.01); *G06F 11/0748* (2013.01); *H04L 41/046* (2013.01); *H04L 41/0654* (2013.01)

(58) Field of Classification Search
CPC ............. G06F 11/0709; G06F 11/0748; G06F 11/079; G06F 11/0793; H04L 41/046; H04L 41/0654
See application file for complete search history.

(56) References Cited

U.S. PATENT DOCUMENTS 6,473,750 B1    10/2002    Petculescu et al.
7,890,802 B2    2/2011    Gerber
(Continued)

OTHER PUBLICATIONS

Cisco systems Inc.; "IT Automation: Evaluate Job Scheduling and Run Book Automation Solutions"; Nov. 2010; 7 pages.
(Continued)

*Primary Examiner* — Joshua P Lottich
(74) *Attorney, Agent, or Firm* — Law Offices of Michael A. Dryja

(57) ABSTRACT

A management computing device receives, from a target computing device located within a remote network, an event generated at the target computing device resulting from an issue at the target computing device. The management computing device determines a remediation process to resolve the issue at the target computing device in an automated manner. The management computing devices executes the remediation process in conjunction with a software agent running on the target computing device to resolve the issue in the automated manner.

15 Claims, 5 Drawing Sheets

(56) References Cited

U.S. PATENT DOCUMENTS

| | | |
|---|---|---|
| 2004/0128583 A1* | 7/2004 | Iulo .................... G06F 11/0709 714/25 |
| 2005/0102681 A1 | 5/2005 | Richardson |
| 2005/0278563 A1 | 12/2005 | Durham et al. |
| 2010/0318836 A1* | 12/2010 | Ness .................. G06F 11/0709 714/4.1 |
| 2012/0311157 A1 | 12/2012 | Erickson et al. |
| 2013/0132778 A1 | 5/2013 | Dagan |
| 2013/0191495 A1 | 7/2013 | Almstrand et al. |

OTHER PUBLICATIONS

Konig, R.; "Engineering of IT Management Automation Along Task Analysis, Loops, Function Allocation, Machine Capabilities"; Apr. 2010; 348 pages.

Lenny Zeltser, "What Is Cloud Anti-Virus and How Does It Work?," Oct. 10, 2010, Lenny Zeitser on Information Security, <http://web.archive.org/web/20101010113820/http://blog.zeltser.com/post/1256199682/what-is-cloud-anti-virus>.

Nizri, G.; "MIR3 and Ayehu Simplify Addition of Automated Notification to Existing IT Systems with Run Book Automation Technology"; May 29, 2013; 4 pages.

PCT; "Notification of Transmittal of the International Search Report and the Written Opinion of the International Searching Authority, or the Declaration"; cited in PCT/US2013/053087; dated Mar. 28, 2014; 9 pages.

Wikipedia, "Antivirus software," Jun. 29, 2013, <https://en.wikipedia.org/w/index.php?title=Antivirus_software&oldid=562098780#cite_note-62>.

\* cited by examiner

AUTOMATED REMOTE NETWORK TARGET COMPUTING DEVICE ISSUE RESOLUTION

BACKGROUND

Computing systems, including server computing devices and other types of computing devices, have become more and more reliable. However, incidents, or issues, sometimes still occur that have to be resolved to ensure optimal continuing operation of the computing systems. Such issues can include hardware and/or software-related issues within the computing systems.

DETAILED DESCRIPTION

Figure 1:
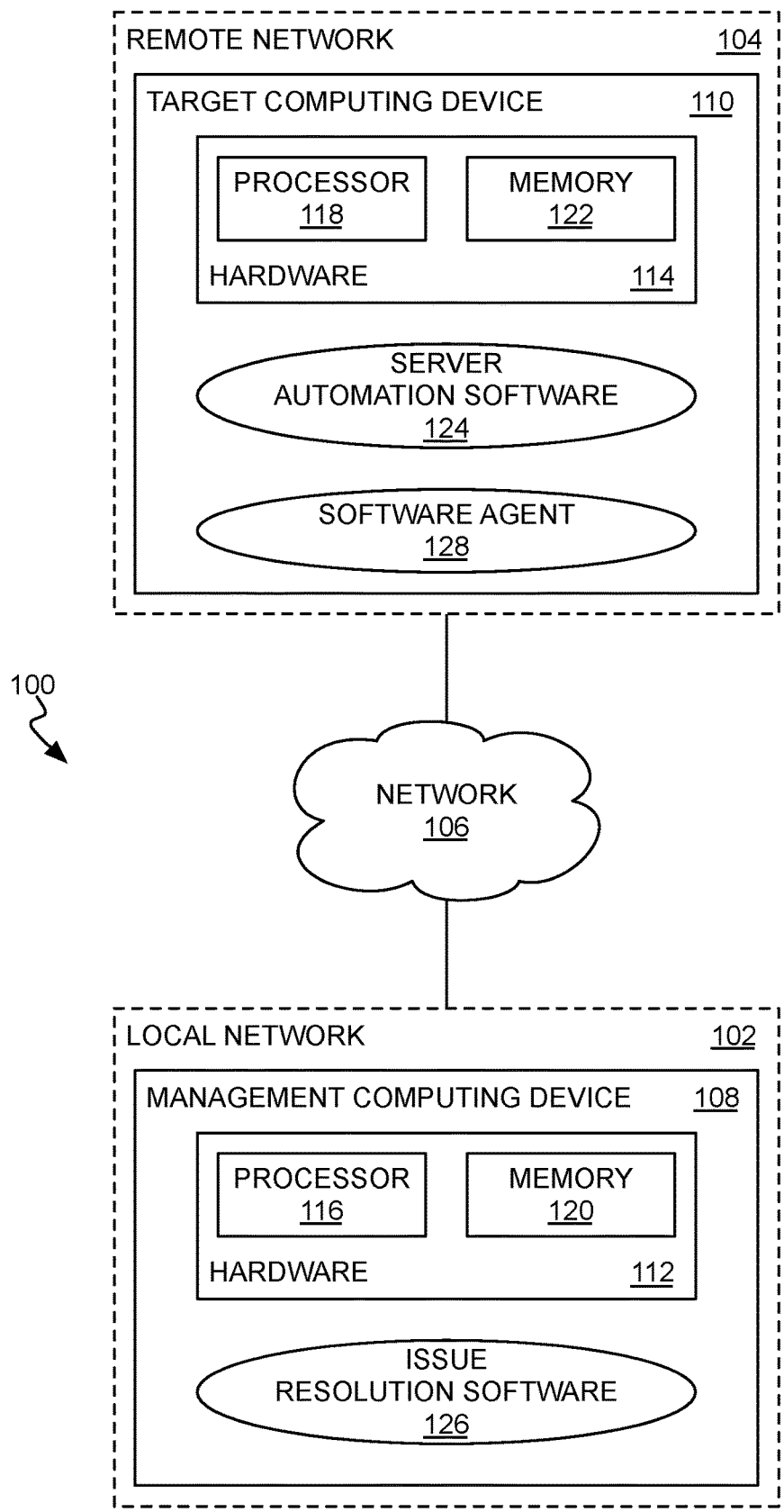
FIG. 1 is a diagram of an example computing system environment in which issue resolution at a target computing device within a remote network is performed via a management computing device within a local network interacting with a software agent at the target computing device.

As noted in the background section, server computing devices and other types of computing systems can experience issues that should be resolved to ensure their optimal continuing operation. For enterprise data centers and other types of architectures in which there are large numbers of such computing systems, specialized software can assist in issue resolution. For instance, many types of issues may be able to be resolved in an automated manner without little or no human intervention, ensuring that relatively scarce information technology (IT) personnel resources are more efficiently allocated. An example of such software is HP Operations Orchestration (HP OO) software, available from the Hewlett-Packard Company of Palo Alto, Calif.

To provide such automated issue resolution, some types of issue resolution software may have to have a vendor's server computing device installed within a customer's network. The vendor's server computing device interacts with computing systems at the vendor's own network to receive instructions regarding a remediation process to resolve a particular issue. The vendor's server computing device then interacts with the customer's server computing device to effect this process to resolve the issue occurring at the latter computing device. For instance, when the issue occurs at the customer's server computing device, the device may generate an event that the computing systems at the vendor's network receives, where these computing systems determine an appropriate remediation process if possible and send corresponding instructions to the vendor's server computing device within the customer's network. This type of approach is agentless, in that no software is installed on the customer's server computing device, but rather the vendor's server computing device has access to the customer's server computing device via appropriate credentials, keys, certificates, and so on.

However, some customers may resist having to install a vendor's server computing device within their own networks, due to potential computer and network security issues and other potential problems. For example, administrator or root access to the customer's server computing devices may be required, and a relatively large number of network ports may have to be opened for the vendor's server computing devices to perform remediation process-related instructions with respect to the customer's server computing devices. The vendor's server computing device may have to have a direct connection to the customer's server computing devices within the customer's network.

Disclosed herein are techniques that at least ameliorate these disadvantages. Such techniques do not require administrator or root access to the customer's server computing device, nor the opening of network ports solely for issue resolution purposes. A vendor's server computing device does not have to be installed within the customer's network that is responsible for issue resolution. No direct connection to the computing devices within the customer's network is required. Besides potentially being more cost effective than existing techniques, the techniques disclosed herein are also likely to be more favorably received by customers, since potential computer and network security issues, among other issues, are at least largely avoided.

FIG. 1 shows an example computing system environment 100. The environment 100 includes a local network 102 and a remote network 104, which are communicatively interconnected to one another via another network 106. The local network 102 may be the network of a vendor, whereas the remote network 104 may be the network of a customer or client of the vendor. The network 106 may be or include one or more public or other types of networks, such as the Internet, for instance. The terminology "local" and "remote" in referencing the networks 102 distinguish the networks 102 from one another, as being separate networks that are interconnected with one another via a (third) network 106.

The local network 102 includes at least one management computing device 108, whereas the remote network 104 includes at least one target computing device 110. Each of the computing devices 108 and 110 may be a server computing device, for instance, and each of the computing devices 108 and 110 can in FIG. 1 in actuality represent more than one computing device. The management computing device 108 includes hardware 112, and the target computing device 110 includes hardware 114. Examples of such hardware 112 and 114 can include, for instance, a processor 116 and memory 120 within the management computing device 108, and a processor 118 and memory 122 within the target computing device 110. Other types of hardware 112 and 114 not depicted in FIG. 1 may be or include storage devices, like non-transitory computer-readable storage media, for instance.

The management computing device 108 has at least issue resolution software 126 installed thereon, such as one or more computer programs. The issue resolution software 126 is executed using the hardware 112. For example, the issue resolution software 126 may be executed by the processor 116 using the memory 120, among other hardware 112. The target computing device 110 has server automation software 124 and a software agent 128 installed thereon, which may each be one or more computer programs, and which are executed using the hardware 114. For example, the server automation software 124 and the software agent 128 may be executed by the processor 118 using the memory 122, among other hardware 114. In some implementations, the software agent 128 may be considered a part of the server automation software 124, such that there are not two separate software instances installed on the target computing device 110.

The server automation software 124 on the target computing device 110 may interact with corresponding server automation software on a management computing device like the management computing device 108 to assist in the management of the target computing device 110. Such management can include discovery, provision, patching, configuration, and script execution of, for, or on the target computing device 110. An example of the server automation software 124 is HP Server Automation (HP SA) software, available from the Hewlett-Packard Company.

The issue resolution software 126 on the management computing device 108 is software that responsive to receiving an event corresponding to an issue at the target computing device 110, determines whether a remediation process is available to resolve the issue in an automated manner, such as without human interaction. The issue resolution software 126 then executes the remediation process to resolve the issue in the automated manner, if such a process is available. An example of such issue resolution software 126 is HP OO software, as previously referenced. The issue resolution software 126 can include one or more software agents different than but working in conjunction with the software agent 128 at the target computing device 110.

Issues that can occur at the target computing device 110 include hardware- and software-related issues. A hardware-related issue may be that hardware is beginning to fail, has become overburdened, or is no longer properly configured or otherwise not operating optimally due to other changes being made elsewhere within the remote network 104, and so on. A software-related issue may be that a computer program is generating errors, or similarly is no longer properly configured or otherwise not operating optimally due to other changes being made elsewhere within the remote network 104, and so on.

An event is a message, such as a network message, sent from the target computing device 110 to the management computing device 108 indicating that a corresponding issue has occurred at the target computing device 110. A remediation process is a series of instructions that are executed at the target computing device 110 under the auspices of the management computing device 108 that are intended to resolve the issue in an unattended manner without human interaction. A remediation process may be in the form of a workflow, a script, and so on. It is noted that the event from the target computing device 110 can take a completely different path to the management computing device 108 as compared to the instructions of the remediation process from the management computing device 108 to the target computing device 110. Furthermore, the event may be generated at the target computing device 110 and/or received at the management computing device 108 using different software as compared to the instructions of the remediation process.

The software agent 128 is installed on the target computing device 110 within or in conjunction with the server automation software 124. The issue resolution software 126 executes the remediation process in conjunction with the software agent 128. A software agent is a computer program that acts for or on behalf of the server automation server 124 in an agency relationship. Because the software agent 128 is installed within or in conjunction with the server automation software 124, the agent 128 leverages existing privileges and other aspects of the software 124. As noted above, however, in some implementations, the software agent 128 and the server automation software 124 are the same software, and are a single entity, as opposed to separate entities as depicted in FIG. 1.

The software agent 128 leverages the server automation infrastructure provided by the issue resolution software 126 in assisting with remediation process execution. This is as opposed to having to have another computing device within the remote network 104 that is responsible for issue resolution. Such leverage particularly occurs where the software agent 128 and the issue resolution software 126 are the same software component.

Figure 2:
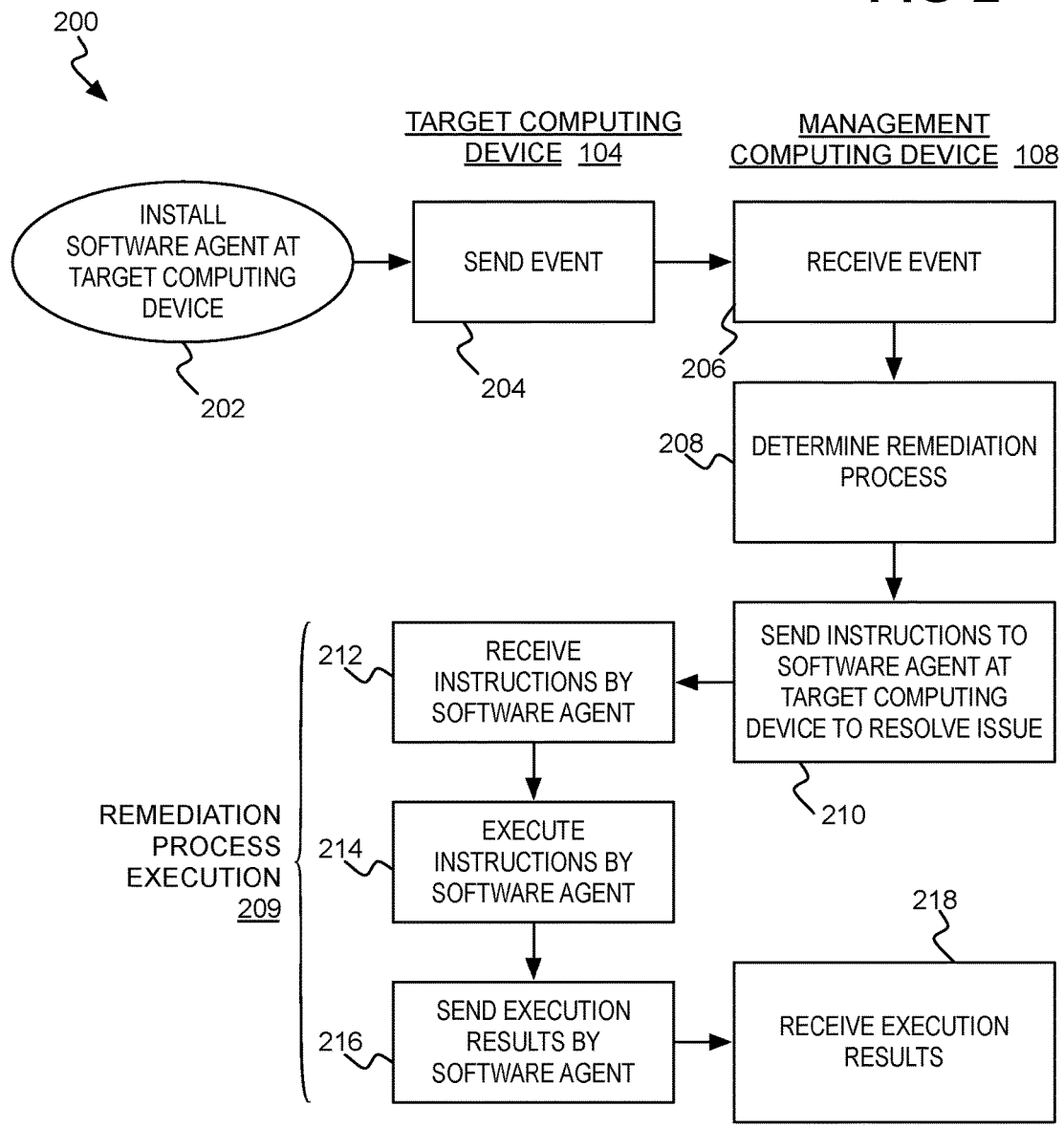
FIG. 2 is a flowchart of an example method for resolving an issue within the computing system environment of FIG. 1.

FIG. 2 shows an example method 200 for resolving an issue at the target computing device 104. Prior to an issue occurring at the target computing device 104, the software agent 128 is installed within or in conjunction with the server automation software 124 at the target computing device 110 (202). When an issue occurs at the target computing device 104, the target computing device 204 generates and sends a corresponding event to the management computing device 108 from the remote network 104 to the local network 102 over the network 106 (204).

The management computing device 108 thus receives the event (206). In response, the issue resolution software 126 at the management computing device 108 determines a remediation process to resolve the corresponding issue at the target computing device 110 in an automated manner (208), where for the purposes of the method 200 it is presumed that such a remediation process exists for the issue in question. The remediation process may be determined in one of a variety of manners, such as those afforded by HP OO software, as previously referenced. For example, a series of rules stored in a database may be filtered and correlated based on the event indicative of the issue to determine the appropriate remediation process.

The remediation process is executed by the issue resolution software 126 at the management computing device 108 in conjunction with the software agent 128 at the target computing device 110 to resolve the issue in an automated manner (209). For instance, remediation process execution can include the issue resolution software 126 sending instructions to the software agent 128 for execution at the target computing device 110 to resolve the issue in an automated manner (210), where the instructions may be in the form of a script. The software agent 128 thus receives the instructions (212), executes them at the target computing device 110 (214), and sends back corresponding execution results to the issue resolution software 126 (216). The issue resolution software 126 receives the execution results (218), on which basis, for instance, the software 126 can assess whether issue resolution has successfully occurred.

Figure 3:
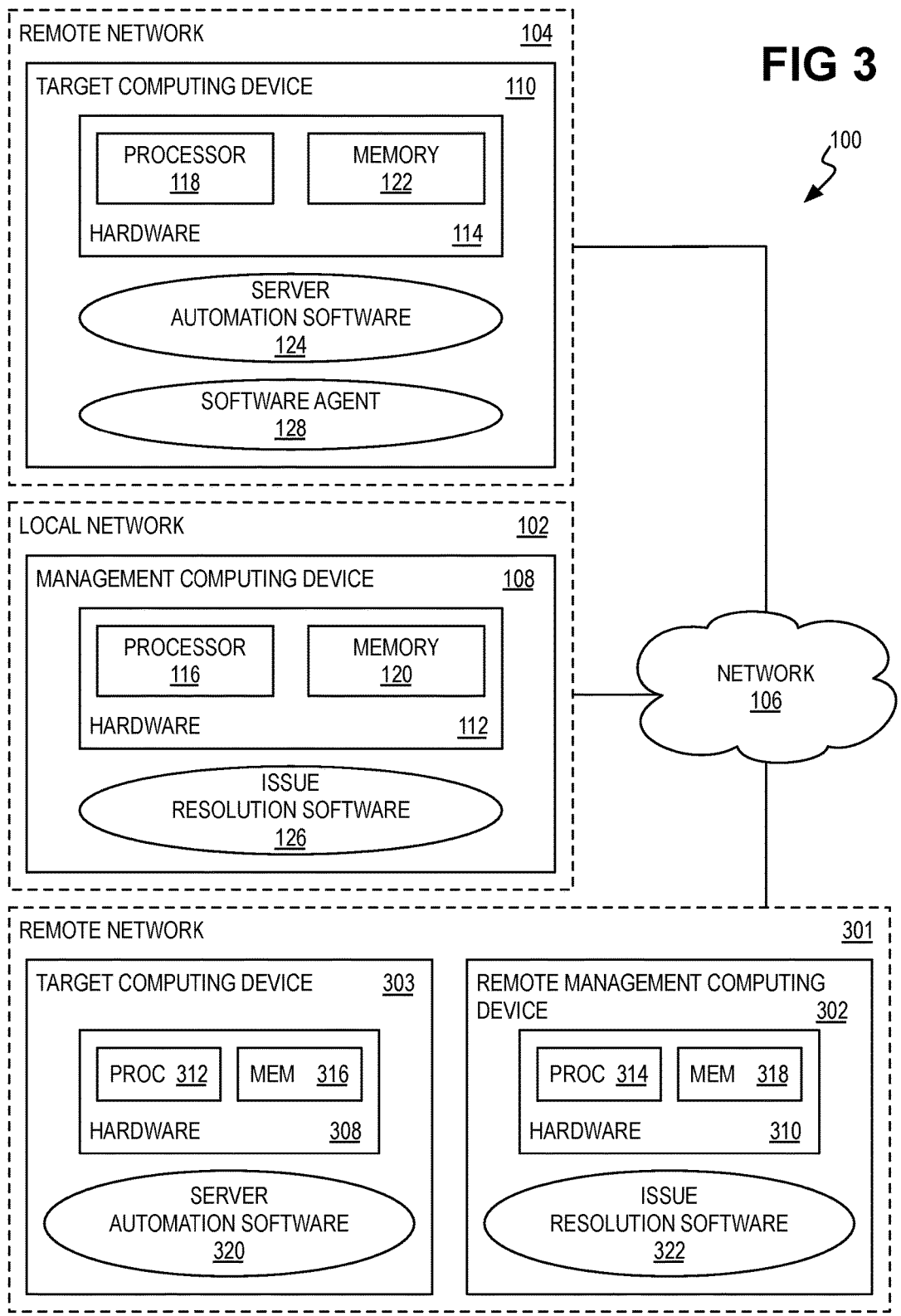
FIG. 3 is a diagram of an example computing system environment in which issue resolution at a target computing device within a remote network is performed via a management computing device within a local network interact with a software agent at the target computing device or with another computing device within the remote network.

FIG. 3 shows the example computing system environment 100 in another implementation. In FIGS. 1 and 2, the issue resolution software 126 of the management computing device 108 at the local network 102 assumed that the target computing device 110 at the remote network 104 includes a software agent 128 in conjunction with which the issue resolution software 126 can execute a remediation process. By comparison, in FIG. 3, while still including the remote network 104 having this target computing device 110 having the software agent 128, there also is a remote network 301 within which a target computing device 303 does not include a software agent in conjunction with which the issue resolution software 126 can execute a remediation process. For instance, issue resolution may have occurred at the remote network 301 in accordance with a legacy version of issue resolution software, such that a remote management computing device 302 has been installed within the remote network 102 for purposes of issue resolution at target computing devices, like the target computing device 303, within the remote network 301.

The computing system environment 100 of FIG. 3 thus includes the local network 102 as in FIG. 1, as well as the remote network 104 as in FIG. 1, but also includes the remote network 301. The local network 102 is communicatively interconnected with both remote networks 104 and 301 via the network 106. The remote network 301 includes at least one target computing device 303, as well as the remote management computing device 302, each of which may be a server computing device, and each of which in actuality can represent more than one computing device. The target computing device 303 includes hardware 308, and the remote management computing device 302 includes hardware 310. Examples of such hardware 308 and 310 can include, for instance, a processor 312 and memory 316 within the target computing device 303, and a processor 314 and memory 318 within the remote management computing device 302. Other types of hardware 308 and 310 not depicted in FIG. 3 may be or include storage devices, such as non-transitory computer-readable storage media.

The target computing device 303 can have server automation software 320 installed thereon, which can include one or more computer programs that are executed by the processor 312 using the memory 316, among other hardware 308. However, in some implementations, no server automation software 320 is installed on the target computing device 303. When present, like the server automation software 124 on the target computing device 110, the server automation software 320 on the target computing device 303 may interact with corresponding server automation software on a management computing device like the management computing device 108 to assist in the management of the target computing device 303. However, unlike the target computing device 110, the target computing device 303 does not have a software agent installed within or in conjunction with the server automation software 320. When present, the issue resolution software 126 on the management computing device 108 thus does not execute the remediation process in conjunction with any software agent on the target computing device 303 for purposes of issue resolution at the computing device 303. Rather, the remote management computing device 302 performs the remediation process in conjunction with the management computing device 108.

Specifically, the remote management computing device 302 is directly connected within the remote network 102 to assist in issue resolution of target computing devices, like the target computing device 303, at the remote network 301. The remote management computing device 302 may have to have administrator or root account access to the target computing device 303, and a range of network ports open at the target computing device 303 to communicate therewith, to assist in such issue resolution at the target computing device 303. The remote management computing device 302 can have issue resolution software 322 installed thereon, which can include one or more computer programs that may be executed by the processor 314 using the memory 318, among other hardware 310. It is noted, however, that in some implementations, the remote management computing device 302 is effectively a pass through, acting simply as an intermediary for the management computing device 108, which performs the issue resolution process.

The issue resolution software 126 on the management computing device 108 receives an event corresponding to an issue at the target computing device 303, and responsively determines whether a remediation process is available to resolve the issue in an automated manner, without human interaction. The issue resolution software 126 then executes the remediation process to resolve the issue in the automated manner, if such a process is available. Unlike issue resolution at the target computing device 110, in which a remediation process is executed in conjunction with the software agent 128 at the target computing device 110, issue resolution at the target computing device 110 occurs via a remediation process being executed in conjunction with the issue resolution software 322 at the remote management computing device 302.

That is, to resolve an issue at the target computing device 303, the issue resolution software 126 on the management computing device 108 executes a remediation process in conjunction with the issue resolution software 322 on the remote management computing device 302. The remote management computing device 302, residing within the remote network 301 that includes the target computing device 303, is responsible for issue resolution at the remote network 301. The issue resolution software 322 on the remote management computing device 302 as such has similar functionality as the software agent 128 on the target computing device 110.

Whereas the software agent 128 assists in issue resolution just at the target computing device 110 on which the agent 128 is installed, the issue resolution software 322 assists in issue resolution at one or more target computing devices within the remote network 102, including the target computing device 303. That is, the software agent 128 assists in issue resolution on the target computing device 110 on which it is installed, whereas the issue resolution software 322 assists in issue resolution at computing devices other than the remote management computing device 302 on which it is installed. The software agent 128 executes instructions received from the issue resolution software 126 in relation to the target computing device 110 on which it is installed. By comparison, the issue resolution software 322 executes instructions receive from the issue resolution software 126 in relation to the target computing device 303 and other target computing devices within the remote network 301.

In this respect, the issue resolution software 126 at the management computing device 108 within the local network 102, responsive to receiving an event from a target computing device within a remote network, determines how issue resolution is to occur at the target computing device in question. For instance, if the target computing device has a software agent installed thereon, like the target computing device 110, then the issue resolution software 126 sends remediation process instructions to this software agent. In this situation, the issue resolution process can occur as has been described above in relation to the method 200 of FIG. 2. By comparison, if there is a remote management computing device installed within the remote network in which the target computing device in question resides, then the issue resolution software 126 sends remediation process instructions to this remote management computing device. The issue resolution software 126 may determine how issue resolution is to occur at a target computing device by looking this information up in a database or table, and so on.

Figure 4:
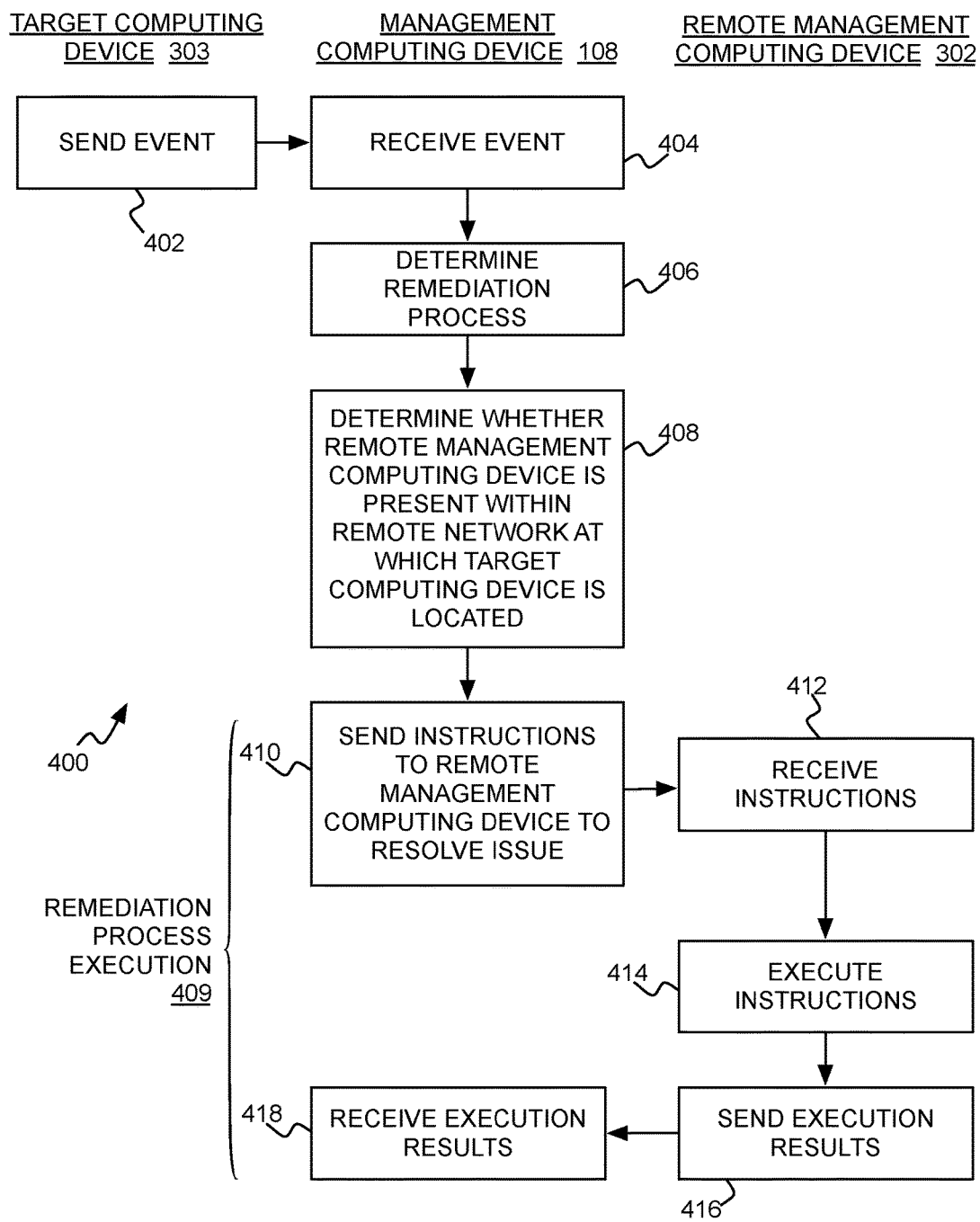
FIG. 4 is a flowchart of an example method for resolving an issue within the computing system environment of FIG. 3 in which the management computing device interacts with another computing device within the remote network other than the target computing device.

FIG. 4 shows an example method 400 for resolving an issue at the target computing device 303. When an issue occurs at the target computing device 303, the target computing device 303 generates and sends a corresponding event to the management computing device 108 from the remote network 301 to the local network 102 over the network 106 (402). The management computing device 108 receives this event (404), and the issue resolution software 126 at the management computing device 108 responsively determines a remediation process to resolve the corresponding issue at the target computing device 303 in an automated manner (406). It is presumed for the purposes of the method 400 that such a remediation process exists for the issue in question at the target computing device 303.

The issue resolution software 126 determines whether a remote management computing device is present within the remote network 301 at which the target computing device 303 is located (408). This determination is made to determine what type of component at the remote network 301 is to assist in executing the remediation process, such as a software agent at the target computing device 303 itself, or a remote management computing device within the remote network 301 like the remote management computing device 302. Because the remote management computing device 302 is present within the remote network 301, and no software agent for issue resolution purposes is installed on the target computing device 303, the issue resolution software 126 thus executes the remediation process in conjunction with the remote management computing device 302 to resolve the issue at the target computing device 303 in an automated manner (409).

For instance, remediation process execution can include the issue resolution software 126 sending instructions to the issue resolution software 322 for execution at the remote management computing device 302 to resolve the issue at the target computing device 303 in an automated manner (410). The issue resolution software 322 receives the instructions (412), executes them at the remote management computing device 302 in relation to the target computing device 303 (414), and sends back corresponding execution results to the issue resolution software 126 (416). The issue resolution software 126 at the management computing device 108 receives the execution results (418), on which basis, for instance, the software 126 can assess whether issue resolution has successfully occurred.

Figure 5:
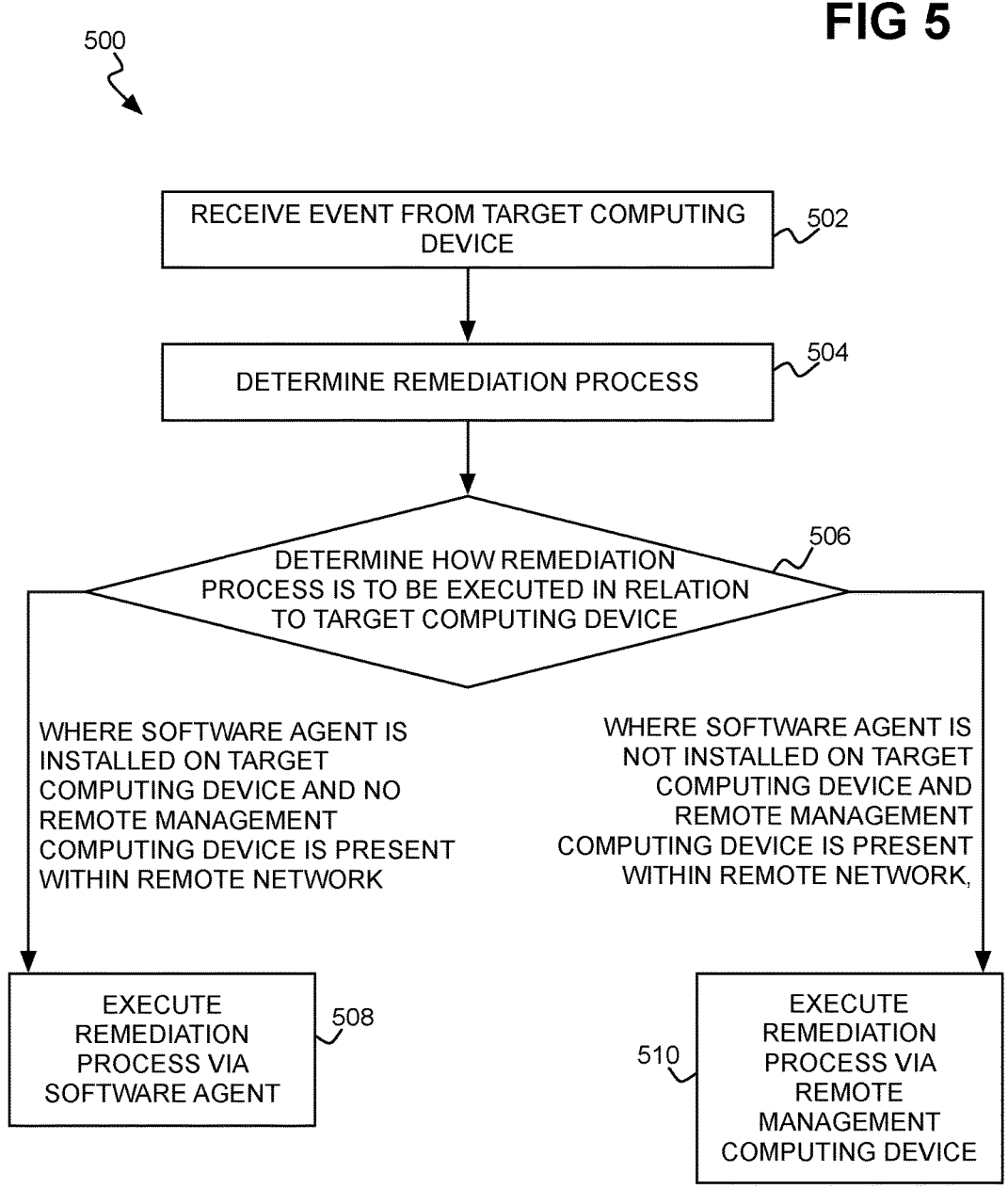
FIG. 5 is a flowchart of an example method for resolving an issue within the computing system environment of FIG. 3 regardless of whether the target computing device at which the issue resolution occurred has a software agent to assist in issue resolution or not.

FIG. 5 shows an example method 500 for resolving an issue within the environment 100 of FIG. 3 by the issue resolution software 126 of the management computing device 108, regardless of whether the issue pertains to the target computing device 110 having the software agent 128 or to the target computing device 303 that does not have such an agent. The management computing device 108 receives an event from a target computing device (502), which is either the target computing device 110 or 303. As before, the management computing device 108 determines a remediation process to resolve the issue in question (504).

The management computing device 108 determines how the remediation process is to be executed in relation to the target computing device at which the issue occurred (506). For instance, if the target computing device in question is the target computing device 110 having a software agent 128, then the remediation process execution 209 of FIG. 2 is performed in which the software agent 128 is employed in lieu of a computing device at the remote network 104 other than the target computing device 100. If the target computing device in question is the target computing device 303 that does not have such a software agent, then the remediation process execution 409 of FIG. 4 is performed in which the remote management computing device 302 that is located with the same remote network 301 as the target computing device 303 is employed.

As such, in the former scenario, the remediation process is executed via the software agent 128 (508), whereas in the latter scenario, the remediation process is executed via the remote management computing device 302 (510). It is noted, however, that the remediation process can be the same regardless of whether the software agent 128 or the remote management computing device 302 is used. That is, the remediation process execution 209 of FIG. 2 can be the same as the remediation process execution 409 of FIG. 4, but for the software agent 128 assisting the execution 209 and the remote management computing device 302 assisting the execution 409.

The method of FIG. 5 thus serves to illustrate that the overall issue resolution process can be substantially identical regardless of whether an event corresponding to an issue is received from a target computing device having a software agent or from a target computing device that does not have one. Furthermore, the method of FIG. 5 serves to illustrate that the issue resolution software 126 at the management computing device 108 can perform issue resolution in relation to heterogeneous target computing devices 110 and 303. That is, the issue resolution software 126 has logic that determines how the remediation process is to be executed in relation to a target computing device 110 that has a software agent 128, as opposed to a target computing device 303 that does not have such a software agent. Therefore, even if the target computing devices at some remote networks have such software agents and other remote networks instead have remote management computing devices, the issue resolution software 126 can accommodate both of these scenarios.

Techniques disclosed herein thus permit for issue resolution to occur at a target computing device within a remote network without having to have a remote management computing device residing within the same remote network. Rather, a software agent is installed on the target computing device to perform such functionality. The software agent can be executed within or in conjunction with server automation software that may have been previously installed on the target computing device, or may be part of the server automation software itself as a single software component as opposed to being a separate or different software component. The software agent, in other words, is present on the target computing device to forego installation of any computing device within the remote network that is responsible for issue resolution at the remote network. However, issue resolution can still occur at a target computing device within a remote network that does have a remote management computing device residing within the same remote network, where the target computing device does not have such a software agent installed thereon.

Furthermore, the techniques disclosed herein provide other advantages as well. For instance, an existing network infrastructure can be employed, without having to require additional access or penetration through a firewall governing access to the remote network. Where the server automation software provides for a robust and/or industry standard script language by which to author workflows, authoring of the remediation process can leverage this functionality as well.

We claim:

1. A non-transitory computer-readable storage medium comprising a computer program executable by a processor of a management computing device to:
   receive, from a target computing device located within a remote network, an event generated at the target computing device resulting from an issue at the target computing device;
   determine whether a computing device resides within the remote network that is responsible for issue resolution at the remote network;
   determine a remediation process to resolve the issue at the target computing device in an automated manner;
   in response to a determination that no computing device resides within the remote network that is responsible for issue resolution at the remote network, execute the remediation process in conjunction with a software agent running on the target computing device to resolve the issue in the automated manner; and
   in response to a determination that a computing device resides within the remote network that is responsible for issue resolution at the remote network, execute the remediation process in conjunction with the computing device residing within the remote network that is responsible for issue resolution, to resolve the issue in the automated manner.

2. The non-transitory computer-readable storage medium of claim 1, wherein the computer program is executable to, in the execution of the remediation process in conjunction with the software agent:
   send instructions to the software agent for execution at the target computing device to resolve the issue in the automated manner; and
   receive execution results back from the software agent regarding resolution of the issue.

3. The non-transitory computer-readable storage medium of claim 1, wherein the computer program is executable to, in the execution of the remediation process in conjunction with the software agent:
   interact with the software agent at the target computing device via a software agent at the management computing device employed in lieu of a computing device within the remote network that is responsible for issue resolution at the remote network.

4. The non-transitory computer-readable storage medium of claim 1, wherein the computer program is executable to, in the execution of the remediation process in conjunction with the computing device residing within the remote network that is responsible for issue resolution:
   send instructions to the computing device residing within the remote network for execution at the target computing device to resolve the issue in the automated manner; and
   receive execution results back from the computing device residing within the remote network regarding resolution of the issue.

5. The non-transitory computer-readable storage medium of claim 1, wherein, when a computing device resides within the remote network that is responsible for issue resolution:
   the computing device has access to an administrator or root account at the target computing device,
   the computing device has a direct connection to the remote network in which the target computing device is located, and
   a plurality of network ports are open at the target computing device for the computing device to communicate with the target computing device.

6. A management computing device comprising:
   a processor; and
   memory comprising instructions executable by the processor to:
     receive, from a target computing device located within a remote network, an event generated at the target computing device resulting from an issue at the target computing device;
     determine whether a computing device resides within the remote network that is responsible for issue resolution at the remote network;
     determine a remediation process to resolve the issue at the target computing device in an automated manner;
     in response to a determination that no computing device resides within the remote network that is responsible for issue resolution at the remote network, execute the remediation process in conjunction with a software agent running on the target computing device to resolve the issue in the automated manner; and
     in response to a determination that a computing device resides within the remote network that is responsible for issue resolution at the remote network, execute the remediation process in conjunction with the computing device residing within the remote network that is responsible for issue resolution, to resolve the issue in the automated manner.

7. The management computing device of claim 6, wherein the instructions to execute the remediation process in conjunction with the software agent are executable to:
   send instructions to the software agent for execution at the target computing device to resolve the issue in the automated manner; and
   receive execution results back from the software agent regarding resolution of the issue.

8. The management computing device of claim 6, wherein the instructions to execute the remediation process in conjunction with the software agent are executable to:
   interact, via a software agent at the management computing device, with the software agent at the target computing device employed in lieu of a computing device within the remote network that is responsible for issue resolution at the remote network,
   wherein the software agent at the target computing device is installed within or in conjunction with a server automation infrastructure at the target computing device, such that the software agent is to leverage the server automation infrastructure in assisting the execution of the remediation process.

9. The management computing device of claim 6, wherein the instructions to execute the remediation process in conjunction with the computing device residing within the remote network that is responsible for issue resolution are executable to:
   send instructions to the computing device residing within the remote network for execution at the target computing device to resolve the issue in the automated manner; and
   receive execution results back from the computing device residing within the remote network regarding resolution of the issue.

10. The management computing device of claim 6, wherein, when a computing device resides within the remote network that is responsible for issue resolution at the remote network:

the computing device that resides within the remote network has access to an administrator or root account at the target computing device, the computing device that resides within the remote network has a direct connection to the remote network in which the target computing device is located, and a plurality of network ports are open at the target computing device for the computing device that resides within the remote network to communicate with the target computing device.

11. A method of a management computing device, the method comprising:

receiving, from a target computing device located within a remote network, an event generated at the target computing device resulting from an issue at the target computing device;

determining whether a computing device resides within the remote network that is responsible for issue resolution at the remote network;

determining a remediation process to resolve the issue at the target computing device in an automated manner; and based on the determination of whether a computing device resides within the remote network that is responsible for issue resolution at the remote network, executing the remediation process in conjunction with a software agent running on the target computing device to resolve the issue in the automated manner or in conjunction with the computing device residing within the remote network that is responsible for issue resolution, to resolve the issue in the automated manner.

12. The method of claim 11, wherein executing the remediation process in conjunction with the software agent comprises:

sending instructions to the software agent for execution at the target computing device to resolve the issue in the automated manner; and receiving execution results back from the software agent regarding resolution of the issue.

13. The method of claim 11, wherein executing the remediation process in conjunction with the software agent comprises:

interacting with the software agent at the target computing device via a software agent at the management computing device employed in lieu of a computing device within the remote network that is responsible for issue resolution at the remote network.

14. The method of claim 11, wherein executing the remediation process in conjunction with a computing device residing within the remote network that is responsible for issue resolution comprises:

sending instructions to the computing device residing within the remote network for execution at the target computing device to resolve the issue in the automated manner; and receiving execution results back from the computing device residing within the remote network regarding resolution of the issue.

15. The method of claim 11, wherein, when a computing device resides within the remote network that is responsible for issue resolution:

the computing device has access to an administrator or root account at the target computing device, the computing device has a direct connection to the remote network in which the target computing device is located, and a plurality of network ports are open at the target computing device for the computing device to communicate with the target computing device.

* * * * *